US009149900B2

(12) United States Patent
Koike et al.

(10) Patent No.: US 9,149,900 B2
(45) Date of Patent: Oct. 6, 2015

(54) MACHINE TOOL (75) Inventors: Shinji Koike, Kanagawa (JP);
Kazumasa Nakayasu, Kanagawa (JP);
Kazuya Mayumi, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 171 days.

(21) Appl. No.: 13/984,818

(22) PCT Filed: Feb. 17, 2011

(86) PCT No.: PCT/JP2011/054053
§ 371 (c)(1),
(2), (4) Date: Aug. 21, 2013

(87) PCT Pub. No.: WO2012/111170
PCT Pub. Date: Aug. 23, 2012

(65) Prior Publication Data
US 2013/0322979 A1    Dec. 5, 2013

(51) Int. Cl.
*B23Q 5/40* (2006.01)
*B23Q 1/25* (2006.01)
(Continued)

(52) U.S. Cl.
CPC ........ *B23Q 1/25* (2013.01); *B23Q 1/015* (2013.01); *B23Q 1/017* (2013.01); *B23Q 5/40* (2013.01); *B23Q 11/0067* (2013.01); *Y10T 409/307952* (2015.01)

(58) Field of Classification Search
CPC .......... B23C 1/02; B23C 1/027; B23Q 5/34; B23Q 5/40; B23Q 5/42; B23Q 5/44; Y10T 409/304088; Y10T 409/306776; Y10T 409/307056; Y10T 409/307112; Y10T 409/307952; Y10T 409/309576

USPC ............... 409/137, 185, 190, 191, 206, 235
See application file for complete search history.

(56) References Cited

U.S. PATENT DOCUMENTS 3,708,238 A * 1/1973 Kissane .................. 408/112
3,958,893 A * 5/1976 Boyajian ................ 408/112
(Continued)

FOREIGN PATENT DOCUMENTS

| GB | 836310 | 6/1960 |
| JP | 5-80632 | 11/1993 |

(Continued)

OTHER PUBLICATIONS

Search Report mailed Mar. 22, 2011, directed to International Application No. PCT/JP2011/054053; 2 pages.
(Continued)

*Primary Examiner* — Sunil K Singh
*Assistant Examiner* — Yasir Diab
(74) *Attorney, Agent, or Firm* — Morrison & Foerster LLP (57) ABSTRACT

According to the machine tool according to the present invention, a top-bottom guide is attached to a back surface of a base frame. By being guided by this top-bottom guide, the lifter moves in the top-bottom direction with respect to the base frame. A drive source which drives rotation of a top-bottom feed screw which extends parallel to the top-bottom guide is attached to a back surface of the base frame. This drive source is coupled with a bottom end of the top-bottom feed screw. As a result, compared to when the drive source is coupled with a top end of the top-bottom feed screw, the center of gravity of the machine tool can be set to a lower position. In this way, a machine tool can be increased in stability.

2 Claims, 5 Drawing Sheets

(51) Int. Cl.
   *B23Q 1/01*   (2006.01)
   *B23Q 11/00*   (2006.01)

(56) References Cited

U.S. PATENT DOCUMENTS

| | | | | |
|---|---|---|---|---|
| 4,310,270 | A | * | 1/1982 | Kraus .......................... 408/234 |
| 5,611,137 | A | * | 3/1997 | Braun ............................ 29/560 |
| 6,120,222 | A | * | 9/2000 | Hiramoto et al. ............. 409/134 |
| 6,220,799 | B1 | * | 4/2001 | Okutani et al. ................ 409/164 |
| 2001/0041651 | A1 | * | 11/2001 | Abe et al. ........................... 483/3 |
| 2012/0020755 | A1 | * | 1/2012 | Hiroshima et al. ........... 409/219 |

FOREIGN PATENT DOCUMENTS

| | | |
|---|---|---|
| JP | 8-336733 | 12/1996 |
| JP | 2002-126959 | 5/2002 |
| JP | 3697697 | 7/2005 |
| JP | 4542001 | 7/2010 |
| WO | WO-2010/113617 | 10/2010 |

OTHER PUBLICATIONS

Extended European Search Report dated Jun. 17, 2014, directed to EP Application No. 11858621.3; 6 pages.

* cited by examiner

MACHINE TOOL

REFERENCE TO RELATED APPLICATIONS

This application is the national stage application under 35 USC 371 of International Application No. PCT/JP2011/054053, filed Feb. 17, 2011, the entire contents of which are incorporated herein by reference.

FIELD OF THE INVENTION

The present invention relates to a machine tool, more particularly relates to a machine tool which machines a workpiece by NC (numerical control).

BACKGROUND OF THE INVENTION

For example, PLTs 1 and 2 disclose machine tools which machine workpieces. In these machine tools, workpieces are attached to tables which are arranged on base frames. At the base frames, discharge holes for discharging chips of workpieces which drop down from the tables extend from the front to the back of the base frames. At the discharge holes, for example, conveyor belts are used to discharge the chips from the backs of the base frames to the outside. On the other hand, working fluid which drops downward from the table is stored inside the discharge holes or in storage tanks which are arranged at the rear of the machine tools.

Above the base frames, feed mechanisms which make lifters to which tools are attached move along guide rails in for example the vertical direction, that is, the Y-axis, are arranged. These feed mechanisms are provided with pairs of top-bottom feed screws which are arranged in parallel with each other, that is, ball screws, and pairs of feed motors which individually drive these ball screws to rotate. The ball screws have nuts which are fastened to the lifters screwed with them. As a result, rotation of the ball screws causes the lifters, that is, tools, to move along the Y-axis in the top-bottom direction.

PLT 1: Japanese Patent No. 4542001
PLT 2: Japanese Patent No. 3697697

SUMMARY OF THE INVENTION

Technical Problem

As explained above, a base frame is formed with a discharge hole which extends from the front to the back, so the feed screw is arranged above the base frame. Above the base frame, space for movement of the lifter has to be secured, so the feed motor has to be attached to the top end of the ball screw. Therefore, the result is a comparatively large weight feed motor is arranged at a position higher than the tool. The guide rail of the lifter is arranged above the discharge hole. Along with this, the center of gravity of the machine tool ends up being set at a high position. As a result, the stability of the machine tool is impaired.

The present invention was made in consideration of the above situation and has as its object the provision of a machine tool which sets a center of gravity at a position lower than the past so as to realize a high stability.

Solution to Problem

To achieve the above object, according to the present invention, there is provided with a machine tool which makes a tool which is attached to a spindle and a workpiece which is attached to the table move relative to each other to machine the workpiece, which machine tool is provided with a bed which serves as a base frame, a lifter which moves along a top-bottom guide which is provided at a back surface of the bed upward from near the floor surface, a spindle head which is provided at the lifter and supports the spindle in a rotatable manner, and a table which is provided at a top surface side of the bed and to which the workpiece is attached.

According to this machine tool, the top-bottom guide is attached to the back surface of the bed. The lifter moves in the top-bottom direction with respect to the bed by the guide of this top-bottom guide. In the machine tool according to the present invention, the top-bottom guide extends at the back surface of the bed upward from near the floor surface. At the time of machining the workpiece, contact with the workpiece causes the tool to be subjected to a cutting resistance. Such a cutting resistance and the weight of the lifter are supported between the lifter and the top-bottom guide. The top-bottom guide extends at the back surface of the bed upward from near the floor surface, so the cutting resistance and the weight of the lifter are supported at a low position. As a result, it is possible to suppress deformation of the machine. The precision of machining at the machine tool can therefore be raised. On the other hand, if the top-bottom guide is arranged upward from the chip discharging hole of the machine tool, the cutting resistance and the weight of the lifter are supported at a relatively high position. As a result, it is not possible to suppress deformation of the machine.

Further, in the machine tool according to the present invention, the lifter is driven in the top-bottom direction by a top-bottom drive means which has a top-bottom feed screw which is provided at the bed to be parallel to the top-bottom guide and a feed motor which is coupled below the top-bottom feed screw and is arranged near the floor surface.

According to this machine tool, the drive source which drives rotation of the top-bottom feed screw which extends in parallel to the top-bottom guide, that is, the feed motor, is attached to the back surface of the bed near the floor surface. This feed motor is coupled with the bottom end of the top-bottom feed screw. As a result, compared with when the feed motor is coupled to the top end of the top-bottom feed screw, the center of gravity of the machine tool is set to a low position. In this way, a machine tool which has a high stability can be realized. The precision of machining at the machine tool can therefore be raised. In addition, the feed motor need not be arranged at the top end of the machine tool, so the overall height of the machine tool can be kept low.

Further, in the machine tool according to the present invention, the feed motor of the top-bottom drive means is provided at a support member which sticks out backward from below the back surface of the bed, and the support member has a through hole which penetrates in the top-bottom direction and receives an output shaft of the feed motor and a cutaway part which connects an outside of the support member and the through hole in a horizontal direction.

In such a machine tool, for example, at the time of replacement of the feed motor, first the output shaft of the feed motor is uncoupled from the top-bottom feed screw. After this, the output shaft of the feed motor is passed through the inside of the cutaway part while the feed motor is made to move in the horizontal direction. As a result, the feed motor can be simply detached from the top-bottom feed screw. In such a machine tool, the feed motor does not have to be detached from the top-bottom feed screw by movement along the top-bottom direction. Therefore, even if the feed motor is arranged in a state with the bottom surface in proximity to the floor surface, the feed motor can be simply replaced.

Further, in the machine tool according to the present invention, the top-bottom drive means has a single top-bottom feed screw which is provided at the center part of a left and right pair of top-bottom guides in parallel with the top-bottom guide and the machine tool is provided with a pair of working fluid channels which receive working fluid which drops down from the periphery of the table to the inside of the bed, divide the working fluid into two branched channels, pass between the top-bottom feed screw and left and right top-bottom guides, and guide the working fluid to a working fluid tank which is provided at the rear of the bed.

According to such a machine tool, the working fluid is introduced by a pair of working fluid channels which are arranged straddling the top-bottom feed screw from the bed to the working fluid tank. As a result, at the back surface of the bed, space for arrangement of the top-bottom feed screw and the feed motor can be secured. The feed motor and top-bottom feed screw can be arranged reliably at the back surface of the bed at a low position.

According to the present invention, there is provided a machine tool which makes a tool which is attached to a spindle and a workpiece which is attached to the table move relative to each other to machine the workpiece, which machine tool is provided with a bed which serves as a base frame, a top-bottom movement member which moves along a left and right pair of top-bottom guides which are provided at the back surface of the bed upward from near the floor surface, a top-bottom drive means which has a single top-bottom feed screw which is provided at a center part of the left and right pair of top-bottom guides in parallel with the top-bottom guides and which makes the top-bottom movement member move while coupling a feed motor to below the top-bottom feed screw so as to be arranged near the floor surface, a left-right movement member which moves along a front and rear pair of left-right guides which are provided at the top-bottom movement member in the left-right direction, a left-right drive means which has a single left-right feed screw which is provided at a center part of the front and rear pair of left-right guides in parallel with the left-right guides and which makes the left-right movement member move, a front-rear movement member which moves along a left and right pair of front-rear guides which are provided at the left-right movement member in the front-rear direction, a front-rear drive means which has a single front-rear feed screw which is provided at a center part of the left and right pair of front-rear guides in parallel with the front-rear guides and makes the front-rear movement member move, a spindle head which is provided at the front-rear movement member and rotatably supports the spindle to which the tool is attached, and a table which is provided at a top surface side of the bed and to which the workpiece is attached.

According to this machine tool, in the same way as explained above, the cutting resistance and the weight of the top-bottom movement member, left-right movement member, and front-rear movement member comprising the lifter and the spindle head can be supported at a low position and deformation of the machine can be suppressed. Further, the overall height of the machine can be kept low. In addition, each movement member can be configured by using a single feed screw for the drive operation. Further, compared with the past where two feed motors were controlled simultaneously, the drive control of each feed motor can be simplified. Further, by arranging each feed screw at the center of the guides, the movement resistance of the guides is carried at the middle and a configuration with a good balance of load can be formed.

DETAILED DESCRIPTION OF THE INVENTION

Below, referring to the attached drawings, an embodiment of the present invention will be explained.

Figure 1:
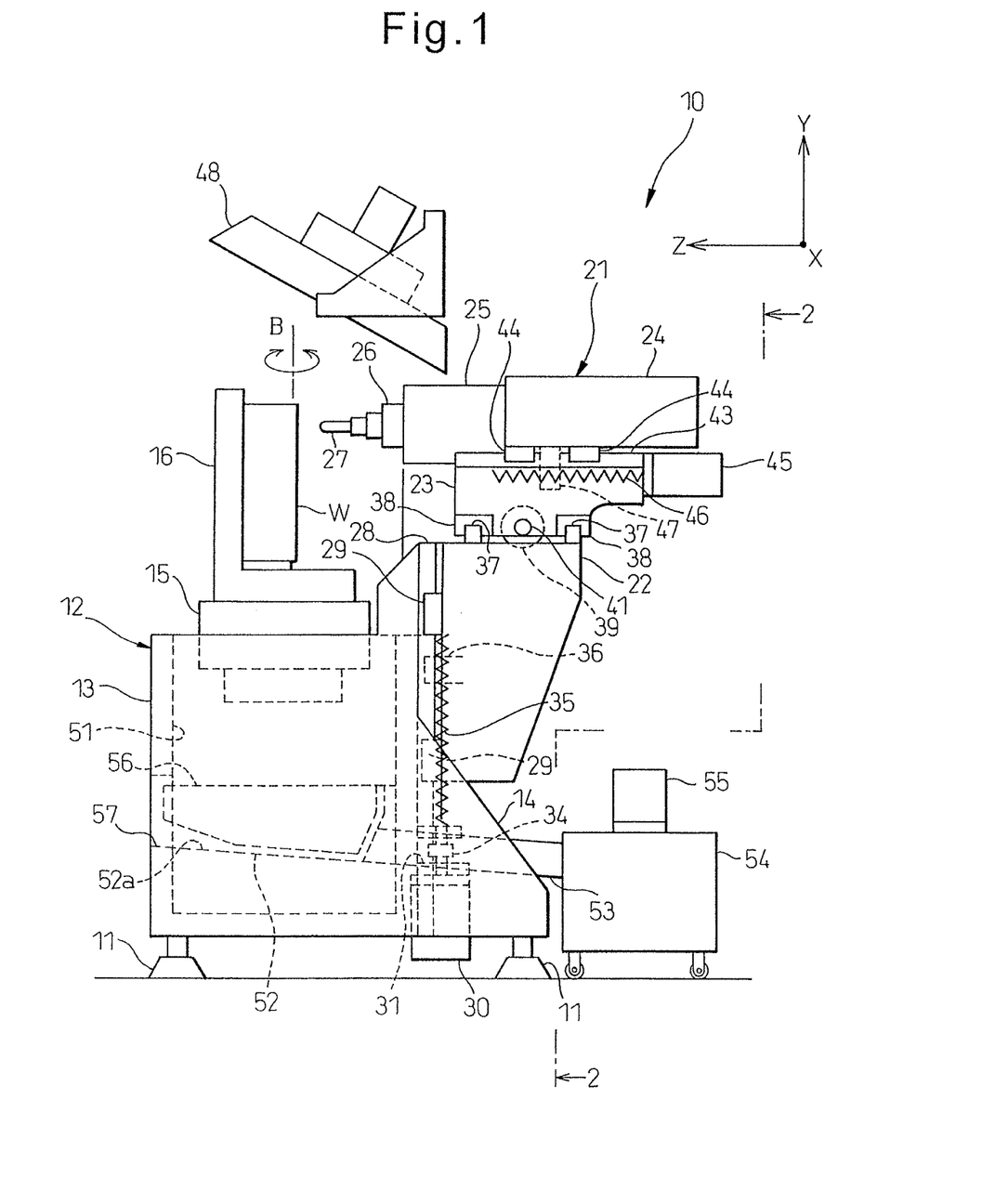
FIG. 1 is a side view which schematically shows the structure of a machine tool according to an embodiment of the present invention.

FIG. 1 is a side view which schematically shows the structure of a machine tool 10 according to an embodiment of the present invention. In the present embodiment, for the machine tool 10, for example, a four-axis horizontal machining center is used. This machine tool 10 is set with a reference coordinate system of three XYZ orthogonal axes. The X-axis is defined as the left-right direction of the machine tool 10 along the horizontal plane (direction vertical to paper surface). The Y-axis is defined as the vertical direction, that is, the top-bottom direction of the machine tool 10. The Z-axis is defined as the front-rear direction of the machine tool 10 along the horizontal plane (left-right direction of paper surface). Note that, for the machine tool 10, instead of a four-axis horizontal type, for example, a five-axis or vertical machining center, milling machine, electrodischarge machine, etc. may be used.

In the Description, the left side of FIG. 1 will be called the front side of the machine tool 10, while the right side will be called the rear side or the back surface side of the machine tool 10. Therefore, if viewing the machine tool 10 from the front side, the left-right direction is the X-axis direction, and the front-rear direction is the Z-axis direction.

Figure 2:
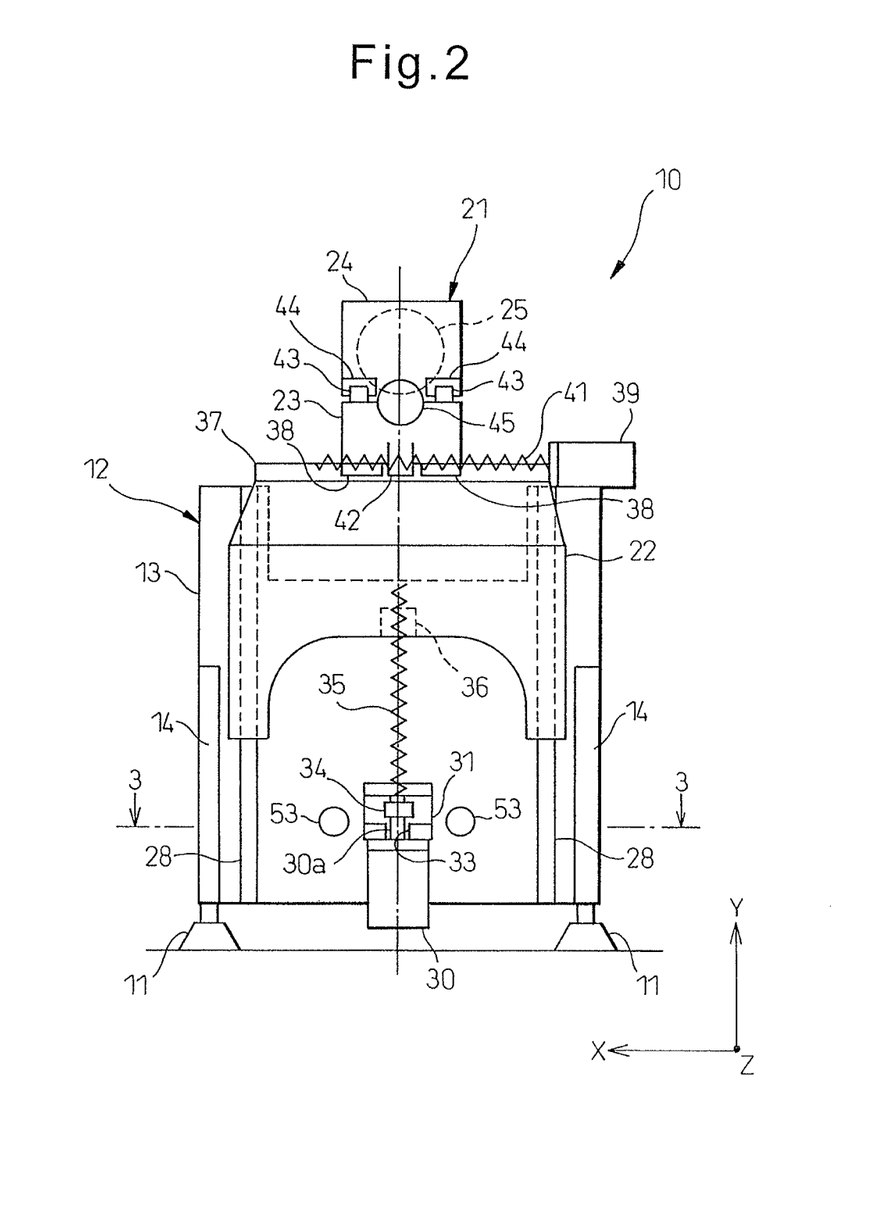
FIG. 2 is a view along the line 2-2 of FIG. 1.

FIG. 2 is a view along a line 2-2 of FIG. 1. Referring to FIG. 2 together, this machine tool 10 is provided with a base frame, that is, a bed 12, which is received at a floor surface by a plurality of leveling blocks 11. The bed 12 is, for example, provided with a columnar bed body 13 and a left and right pair of reinforcement ribs 14 and 14 which stick out from the back of the bed body 13 to the rear in the Z-axis direction. On the top surface of the bed body 13, a table 15 is arranged. The table 15 is driven by a drive source which is built inside the bed body 13, that is, a servo motor, to rotate about an axis of rotation which extends parallel to the Y-axis in the B-axis direction. On the table 15, an angle plate 16 is fastened. At the angle plate 16, a workpiece W to be machined is attached.

At the back of the bed body 13, a lifter 21 is attached. The lifter 21 is provided with a top-bottom movement member 22 which is arranged at the back surface of the bed body 13 and which moves back and forth linearly along the Y-axis, a left-right movement member 23 which is arranged on the top-bottom movement member 22 and which moves back and forth linearly along the X-axis, and a front-rear movement member 24 which is arranged on the left-right movement member 23 and which moves back and forth linearly on the Z-axis. The front-rear movement member 24 is provided with a spindle head 25. At the front end of the spindle head 25, the tool 27 is attached in a detachable manner through a spindle 26 which is supported at the spindle head 25 in a rotatable manner. The tool 27 defines an axis of rotation parallel to the Z-axis. In this way, the tool 27 faces the workpiece W which is fastened to the angle plate 16.

The top-bottom movement member 22 is supported by a left and right pair of top-bottom guides, that is, Y-axis guide rails 28 and 28, which are attached to the back surface of the bed body 13 in parallel to each other in the vertical direction. In the present embodiment, the Y-axis guide rails 28 extend upward from near the floor surface, that is, the bottom surface of the bed body 13. The top ends of the Y-axis guide rails 28 are arranged upward from the top surface of the bed body 13. The Y-axis guide rails 28 support a pair of guide blocks 29 and 29 which are arranged on the Y-axis guide rails 28 in series in the Y-axis direction. The guide blocks 29 are supported at the top-bottom movement member 22. In this way, the top-bottom movement member 22 can move back and forth through the guide blocks 29 on the Y-axis guide rails 28 and 28.

Near the floor surface of the back surface of the bed body 13, a drive source comprised of a top-bottom feed motor, that is, a Y-axis servo motor 30, is arranged between the pair of Y-axis guide rails 28 and 28 at equal distances from the Y-axis guide rails 28 and 28. In the present embodiment, the bottom surface of the Y-axis servo motor 30 is arranged at a position closer to the floor surface than the bottom surface of the bed body 13, but so long as being arranged near the floor surface, the bottom surface of the Y-axis servo motor 30 may be higher than the bottom surface of the bed body 13. The Y-axis servo motor 30 is attached at the bottom surface of a for example plate-shaped support member which sticks out from the back surface of the bed body 13, that is, a bracket 31. The bracket 31 is formed from a flat plate which extends along the XZ plane. In the present embodiment, the bracket 31 is formed integrally with the back surface of the bed body 13 at its base end defined in the Z-axis direction.

Figure 3:
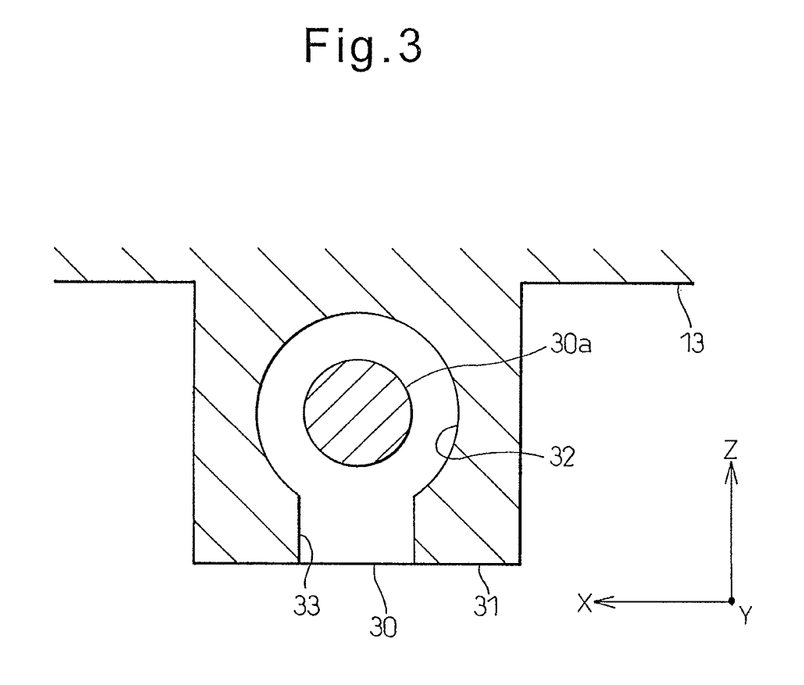
FIG. 3 is a partial enlarged cross-sectional view along the line 3-3 of FIG. 2.

FIG. 3 is a partial enlarged cross-sectional view along a line 3-3 of FIG. 2. Referring to this along with FIG. 3, the bracket 31 is formed with a for example columnar through hole 32 which penetrates along the Y-axis from the top surface to the bottom surface of the bracket 31. The through hole 32 has a larger diameter than the output shaft 30a which sticks out from the top surface of the Y-axis servo motor 30 in the Y-axis direction. As a result, the through hole 32 receives the output shaft 30a. The bracket 31 supports the Y-axis servo motor 30 around the output shaft 30a. At the front end of the bracket 31 defined in the Z-axis direction, a cutaway part 33 which connects the space outside from the contour of the bracket 31 and the through hole 32 is formed along the XZ plane. In the present embodiment, the width of the cutaway part 33 which is defined in the X-axis direction is set larger than the diameter of the output shaft 30a.

At the top end of the output shaft 30a, the bottom end of one top-bottom feed screw, that is, the Y-axis ball screw 35, is coupled through the coupling 34. The Y-axis ball screw 35 extends along the Y-axis at a position between the pair of Y-axis guide rails 28 and 28 at equal distances from the Y-axis guide rails 28 and 28, that is, at position at the center part of the Y-axis guide rails 28 and 28. A nut 36 is screwed with the Y-axis ball screw 35. The nut 36 is fastened at the top-bottom movement member 22. If the Y-axis servo motor 30 rotates, the Y-axis ball screw 35 is driven to rotate about an axis of rotation parallel to the Y-axis. The nut 36, that is, the top-bottom movement member 22, moves back and forth in the top-bottom direction by an amount of movement corresponding to the amount of rotation of the Y-axis ball screw 35. Note that, the Y-axis servo motor 30 and the Y-axis ball screw 35 form the top-bottom drive means of the present invention.

At the top surface of the top-bottom movement member 22, a front and rear pair of left-right guides which extend along the X-axis in parallel with each other, that is, X-axis guide rails 37 and 37, are attached. In the present embodiment, as clear from FIG. 2, the X-axis guide rails 37 and 37 substantially extend from one of the Y-axis guide rails 28 to the other of the Y-axis guide rails 28. At the X-axis guide rails 37 and 37, a pair of guide blocks 38 and 38 which are arranged on the X-axis guide rails 37 in series in the X-axis direction are supported. The guide blocks 38 are fastened to the left-right movement member 23. In this way, the left-right movement member 23 can move back and forth on the X-axis guide rails 37 and 37 through the guide blocks 38.

On the top-bottom movement member 22, a drive source comprised of a left-right feed motor, that is, an X-axis servo motor 39, is arranged. The output shaft (not shown) of the X-axis servo motor 39 is coupled through a coupling (not shown) to a single left-right feed screw, that is, X-axis ball screw 41. The X-axis ball screw 41 extends along the X-axis direction at a position between the pair of X-axis guide rails 37 and 37 at equal distances from the X-axis guide rails 37, that is, at a position at the center part of the X-axis guide rails 37 and 37. A nut 42 is screwed with the X-axis ball screw 41. The nut 42 is fastened to the left-right movement member 23. If the X-axis servo motor 39 turns, the X-axis ball screw 41 is driven to rotate about an axis of rotation parallel to the X-axis. The nut 42, that is, the left-right movement member 23, moves back and forth in the left-right direction by an amount of movement corresponding to the amount of rotation of the X-axis ball screw 41. Note that, Y-axis servo motor 39 and Y-axis ball screw 41 form the left and right drive means of the present invention.

On the top surface of the left-right movement member 23, a left and right pair of front-rear guides which extend along the Z-axis in parallel with each other, that is, Z-axis guide rails 43 and 43, are attached. In the present embodiment, at the Z-axis guide rails 43 and 43, a pair of guide blocks 44 and 44 which are arranged on the Z-axis guide rails 43 in series in the Z-axis direction are supported. The guide blocks 44 are fastened to the front-rear movement member 24. In this way, the front-rear movement member 24 can move back and forth through the guide blocks 44 on the Z-axis guide rails 43 and 43.

On the left-right movement member 23, a drive source comprised of a front-rear feed motor, that is, an Z-axis servo motor 45, is arranged. The output shaft (not shown) of the Z-axis servo motor 45 is coupled through a coupling (not shown) to a single front-rear feed screw, that is, Z-axis ball screw 46. The Z-axis ball screw 46 extends along the Z-axis at a position between the pair of Z-axis guide rails 43 and 43 at equal distances from the Z-axis guide rails 43, that is, at a position at the center part of the Z-axis guide rails 43 and 43. A nut 47 is screwed with the Z-axis ball screw 46. The nut 47 is fastened to the front-rear movement member 24. If the Z-axis servo motor 45 rotates, the Z-axis ball screw 46 is driven to rotate about an axis of rotation parallel to the Z-axis. The nut 47, that is, the front-rear movement member 24, moves back and forth in the front-rear direction by an amount of movement in accordance with the amount of rotation of the Z-axis ball screw 46. Note that, Z-axis servo motor 45 and Z-axis ball screw 46 form the front-rear drive means of the present invention.

Inside the spindle head 25, a spindle motor (not shown) is installed. Due to the rotational drive operation of the spindle motor, the spindle 26, that is, the tool 20, can rotate about an axis of rotation parallel to the Z-axis. The linear movement of the above-mentioned top-bottom movement member 22, left-right movement member 23, and front-rear movement member 24 and the rotational movement of the table 15 are used as the basis to realize relative movement of the tool 27 and the workpiece W. The relative movement is realized based on drive signals which are supplied from the NC device which is built into the machine tool 10. The tool 27 which rotates during the relative movement of the tool 27 and the workpiece W contacts the workpiece W at a predetermined machining point. In this way, the workpiece W is machined to a desired shape.

As clear from FIG. 2, if the left-right movement member 23 is positioned at an intermediate position of the distance of the back and forth movement of the X-axis direction, the center axis of the spindle head 25 is perpendicular to an axis of rotation of the Y-axis ball screw 35. In the present embodiment, the center axis of the spindle head 25 matches the axis of rotation of the tool 27. Further, the Y-axis ball screw 35 and the Y-axis servo motor 30 are arranged below the tool 27 and the spindle head 25, that is, at positions close to the floor surface. At the same time, the Y-axis ball screw 35 and the Y-axis servo motor 30 are arranged below the top surface of the bed body 13, that is, at positions close to the floor surface. In the present embodiment, the Y-axis servo motor 30 is arranged next to the floor surface.

Above the bed body 13, a circular tool magazine 48 is arranged. The tool magazine 48 holds a plurality of tools 27. When a tool 27 has to be changed, the spindle head 25 retracts from the machining region of the workpiece W to the outside and faces the outside of the tool magazine 48. At this time, the spindle head 25 returns the currently used tool 27 to the tool magazine 48 and receives the tool 27 which is used from this. The spindle head 25 in which the new tool 27 is attached again makes the tool 27 advance into the machining region of the workpiece W. In this way, the workpiece W continues to be machined in the machining region.

As clear from FIG. 1, inside of the bed body 13, for example, an angular columnar cavity 51 is formed. The cavity 51 opens toward the top. Inside this cavity 51, a working fluid receiver 52 which is arranged below the table 15 is formed. The working fluid receiver 52 defines on its surface a slanted surface 52a which approaches the floor surface the more from the front of the bed body 13 to the rear. The working fluid receiver 52 receives working fluid which is injected to the workpiece W and flows down from the periphery of the table 15 to the inside of the cavity 51 during machining of the workpiece W. Due to the action of the slanted surface 52a, the working fluid flows toward the rear end of the working fluid receiver 52.

This working fluid receiver 52 is coupled with first ends of a left and right pair of working fluid channels which extend to the rear in the Z-axis direction from the back surface of the bed body 13, that is, the pipes 53 and 53. In this way, the channel of the working fluid is split into two. As clear from FIG. 2, the pipes 53 and 53 sandwich the Y-axis servo motor 30 and Y-axis ball screw 35 between them. The other ends of the pipes 53 and 53 are coupled with a working fluid tank 54 which is arranged at the back in the Z-axis direction from the back surface of the bed body 13. The pipes 53 and 53 approach the floor surface the more from the working fluid receiver 52 toward the working fluid tank 54. In this way, the pipes 53 and 53 can guide working fluid from the working fluid receiver 52 toward the working fluid tank 54.

The working fluid tank 54 can store working fluid which is guided from the working fluid receiver 52 by the pipes 53 and 53. The working fluid tank 54 has a pump 55 attached to it. The pump 55 supplies working fluid which was stored in the working fluid tank 54 toward the machining region of the workpiece W. Before supplying it, inside the working fluid tank 54, fine chips of the workpiece W are removed by filtration. The thus filtered working fluid is used for ejection again toward the workpiece W. In this way, in the machine tool 10, the working fluid is reused.

At the working fluid receiver 52, a for example tray-shaped chip receiver 56 which is formed attachably/detachably to the base frame 12 is arranged. The chip receiver 56 is formed to a size of an extent which covers all area of the working fluid receiver 52. The bottom surface of the chip receiver 56 is formed at least partially in a net shape. As a result, working fluid which flows into the chip receiver 56 can flow down on the slanted surface 52a of the working fluid receiver 52. On the other hand, relatively large chips of the workpiece W which are contained in the working fluid remain at the bottom surface of the chip receiver 56. In this way, the working fluid is filtered by the chip receiver 56.

The front surface of the bed body 13 is formed with an opening 57. The opening 57 faces the front end of the working fluid receiver 52 and the front end of the chip receiver 56. The opening 57 is set to a size of an extent enabling the chip receiver 56 to be pulled out from the front of the bed body 13 to the front. The front end of the chip receiver 56 may be formed with a handle (not shown). Such a handle may be used so that the chip receiver 56 is simply pulled out along the slanted surface 52a to the front. In this way, the chip receiver 56 is formed to be able to be attached to and detached from the bed body 13. Note that, due to the action of the slanted surface 52a, leakage of working fluid from the opening 57 to the outside is prevented.

Figure 4:
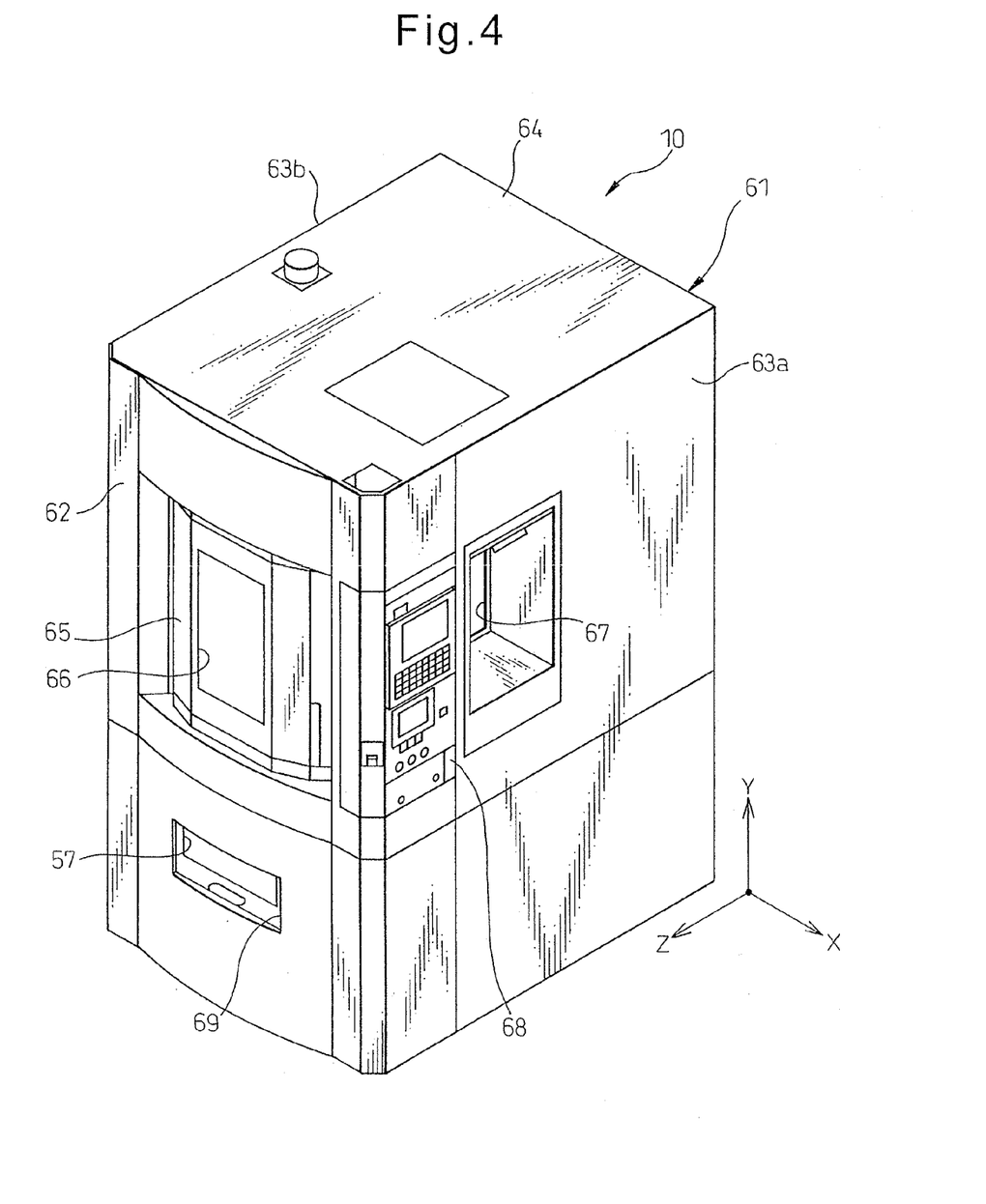
FIG. 4 is a perspective view which schematically shows the appearance of a machine tool according to an embodiment of the present invention.

FIG. 4 is a perspective view which schematically shows the appearance of a machine tool 10 according to an embodiment of the present invention. The machine tool 10 is provided with for example a box-shaped splash guard 61 which forms an inside space which holds all of the above-mentioned components. The splash guard 61 is provided with a front panel 62 which rises up from the floor surface and closes the front surface of the inside space, a right side panel 63a and left side panel 63b which rise up from the floor surface, close the side surfaces of the inside space, and extend in parallel to each other, a top panel 64 which expands along the horizontal direction and closes the top surface of the inside space, and a back panel (not shown) which rises up from the floor surface and closes the back of the inside space (not shown).

The front panel 62 is provided with a sliding door 65 which allows access to the inside space inside of the splash guard 61. The sliding door 65 is slid open from the right side to the left side when viewed from the front surface of the front panel 62. In this way, the inside space of the splash guard 61 is opened. The sliding door 65 may be formed with a rectangular monitoring window 66. On the other hand, the right side panel 63a is provided with a rectangular monitoring window 67. Inside the monitoring windows 66 and 67, transparent glass plates are fit. Note that, while not shown in FIG. 3, the left side panel 63b may also be provided with a monitoring window which has a similar configuration to the mounting window 67 of the right side panel 63a.

The right side panel 63a has a control panel 68 installed in it adjoining the monitoring window 67. The control panel 68 is connected to the above-mentioned NC device. The control panel 68 spreads from the right side panel 63a to the front panel 62. In this way, the control panel 68 is arranged between the monitoring window 66 and monitoring window 67 of the sliding door 65. At the control panel 68, a display panel which displays the operating states of the components explained above and various input buttons is arranged. The operator of the machine tool 10 can input operating commands through the control panel 68 to the NC device. In this way, the NC device can operate the components which are held in the splash guard 61.

The front panel 62 is formed with an opening 69. Inside the opening 69, an opening 57 which is formed at the front surface of the bed body 13 is arranged. In this way, the opening 69 is connected to the opening 57. The opening 69 is set to a size of an extent which enables the chip receiver 56 to be pulled out from the front surface of the splash guard 11 to the front. According to such a configuration, the chip receiver 56 can be pulled out from the holding position where it is arranged on the slanted surface 52a of the working fluid receiver 52 through the openings 57 and 69 to the outside pullout position of the splash guard 61. As a result, the chips which build up at the chip receiver 56 are taken out from the machine tool 10. After this, the chip receiver 56 is again returned through the openings 57 and 69 to the slanted surface 52a of the working fluid receiver 52.

In such a machine tool 10, the Y-axis servo motor 30 and the Y-axis ball screw 35 are arranged at the back surface of the bed body 13. The Y-axis servo motor 30 is coupled with the bottom end of the Y-axis ball screw 35. In the present embodiment, the Y-axis guide rail 28, Y-axis servo motor 30, and Y-axis ball screw 35 are arranged below the spindle head 25. In particular, the Y-axis guide rail 28 is arranged so that its bottom end extends to near the floor surface, while the Y-axis servo motor 30 is arranged adjacent to the floor surface. As a result, it is possible to set the center of gravity of the machine tool 10 at a lower position than in the past. It is possible to realize a machine tool 10 which has a higher stability than in the past. In this way, it is possible to improve the precision of machining of the machine tool 10. In addition, the Y-axis servo motor 30 need not be arranged at the top end of the machine tool 10, so the overall height of the machine tool 10 can be made smaller.

Further, in the machine tool 10, at the time of machining a workpiece W, contact with the workpiece W causes the tool 27 to be subjected to cutting resistance in for example the Z-axis direction. This cutting resistance acts between the top-bottom movement member 22 and the Y-axis guide rails 28 and 28. The Y-axis guide rails 28 and 28 extend upward from near the bottom surface of the bed body 13, so can support the cutting resistance at a low position inside the machine tool 10. As a result, in the machine tool 10, compared with the case like in the prior art where the Y-axis guide rails 28 are arranged adjoining the top end of the machine tool 10, deformation of the machine can be suppressed. In this way, it is possible to improve the precision of machining at the machine tool 10.

Furthermore, top-bottom movement of the top-bottom movement member 22 is realized by a single Y-axis ball screw 35. The single Y-axis ball screw 35 is arranged in parallel to the Y-axis guide rails 28 and 28 at positions at equal distances from the Y-axis guide rails 28, that is, at a position at the center part. As a result, compared with the past where two ball screws were used to realize top-bottom movement of the top-bottom movement member, the structure of the feed mechanism can be simplified. At the same time, top-bottom movement of the top-bottom movement member 22 is realized by just driving rotation of a single Y-axis ball screw 35. As a result, compared with the past where two ball screws were used to realize top-bottom movement of the top-bottom movement member 22, simultaneous control of two drive sources, that is, servo motors, is no longer necessary and control of the Y-axis servo motor 30 can also be simplified. Still further, by arranging ball screws 35, 41, and 47 at the center parts of the guide rails 28, 37, and 43, the movement resistances of the guide rails 28, 37, and 43 are supported at the centers and a configuration with a good loading balance becomes possible.

Further, working fluid is guided from the working fluid receiver 52 to the working fluid tank 54 by two pipes 53 and 53 which are arranged straddling a single Y-axis ball screw 35. According to such a configuration, it is possible to secure space for arranging the Y-axis ball screw 35 and Y-axis servo motor 30 at the back side of the bed body 13. As a result, it is possible to effectively utilize the space inside the machine tool 10. In addition, the chip receiver 56 can be simply pulled out to the outside from an opening 69 which is formed in the front panel 62 of the splash guard 61, so it is possible to simply discharge chips from the machine tool 10.

Still further, the Y-axis servo motor 30 is attached to a bracket 31 which is integrally formed with the back surface of the bed body 13. The bracket 31 is formed with a cutaway part 33 which has a larger width than the diameter of the output shaft 30a of the Y-axis servo motor 30. As a result, when replacing the Y-axis servo motor 30, it is possible to move an output shaft 30a through the cutaway part 33 while making the Y-axis servo motor 30 move horizontally in the Z-axis direction to easily detach the Y-axis servo motor 30. The Y-axis servo motor 30 does not have to be detached by top-bottom movement along the Y-axis. Therefore, even if Y-axis servo motor 30 is arranged in a state with the bottom surface in proximity to the floor surface, the Y-axis servo motor 30 can be simply replaced.

Figure 5:
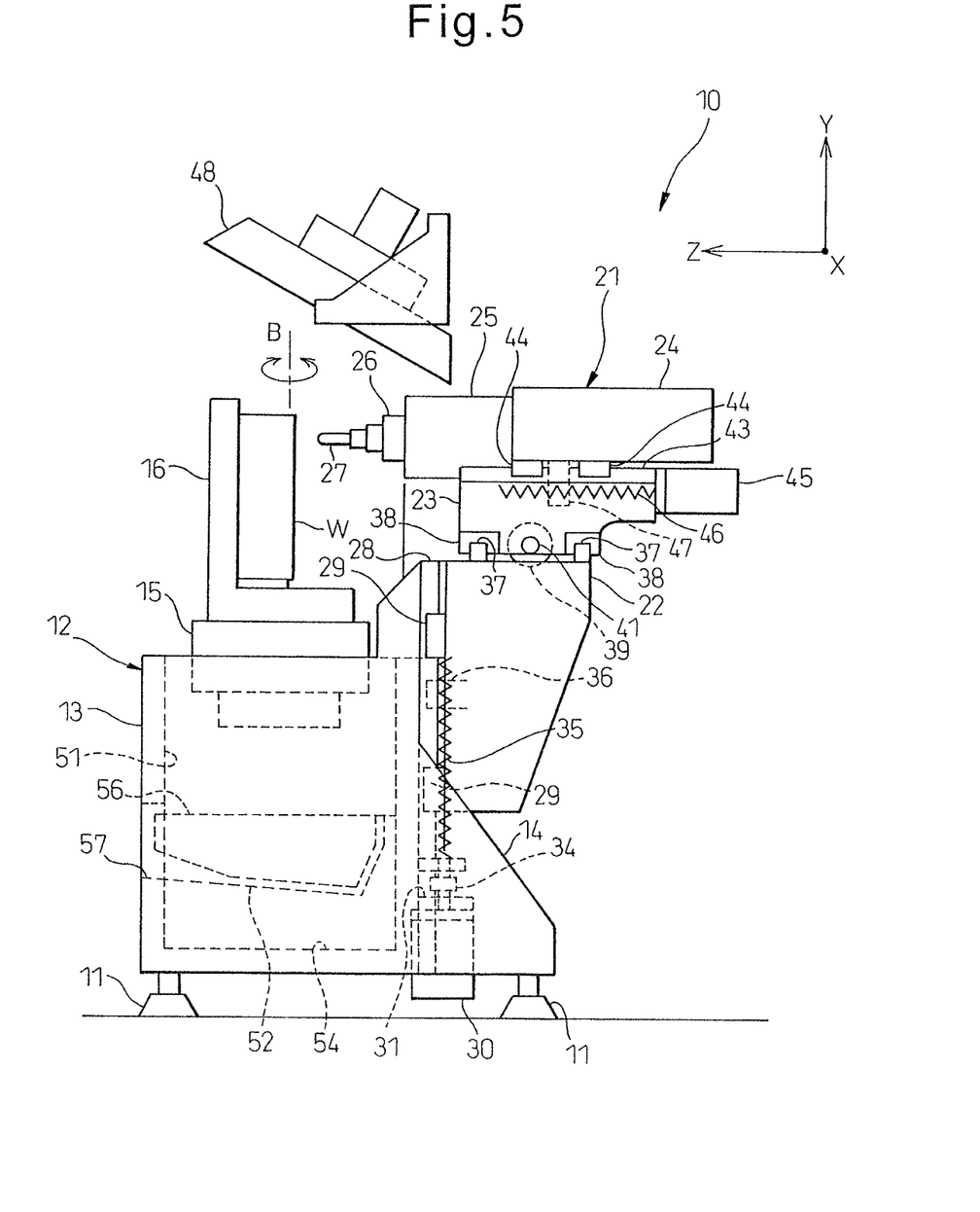
FIG. 5 is a side view which schematically shows the structure of a machine tool according to a modified example of the embodiment of the present invention.

FIG. 5 is a side view which schematically shows the structure of a machine tool 10 according to a modified example of an embodiment of the present invention. Components equivalent to those explained above are assigned the same reference notations etc. In this machine tool 10, a working fluid tank 54 is arranged below a working fluid receiver 52 inside a cavity 51 of the bed body 13. Note that, a pump 55 is similarly arranged in the cavity 51 (not shown). On the other hand, in this machine tool 10, introduction of the above-mentioned pipes 53 is omitted. The thus used working fluid flows down from the working fluid receiver 52 to the working fluid tank 54. According to such a configuration, the Y-axis servo motor 30 and Y-axis ball screw 35 can be reliably arranged at the back surface of the bed body 13. Further, the structure of the machine tool 10 may be further simplified. Note that, the working fluid tank 54 may also not be particularly provided and the bed body 13 itself may replace it.

In addition, in the above such machine tool 10, instead of the chip receiver 56, a belt conveyor (not shown) may also be built into the bed body 13. The belt conveyor extends from an inside end which is arranged at a position below the table 15 in the bed body 13 to an outside end which is arranged in a space outside of the splash guard 61. In this way, the belt conveyor can discharge chips which drop down around the table 15 to the outside of the machine tool 10. The outer end of the belt conveyor may stick out to the outside from the front, right side, or left side of the splash guard 61. At this time, the working fluid is guided from the above-mentioned working fluid receiver 52 to the working fluid tank 54.

Further, the machine tool 10 may employ a sliding guide system instead of a roller guide system using X-axis, Y-axis, and Z-axis guide rails and guide blocks.

Note that, a knee type milling machine employs a structure where a top-bottom movement member called a "knee" on which the table is placed is made to rise and lower by a ball screw provided vertically below it. The table has various weights of workpieces attached to it, so the various parameters of the servo motor of the top-bottom drive means are adjusted to match with the maximum weight. As a result, there was the problem that while, in the case of a light weight workpiece, it would be possible to perform a high acceleration, a high deceleration or other high response feed operation, it was only possible to perform a low response feed operation matched with the maximum weight and therefore efficiency could not be obtained. The present invention employs a configuration where the table side to which the workpiece is attached does not move in the top-bottom direction (Y-axis direction) and in which the constant weight spindle head side moves in the top-bottom direction. Therefore, there is the advantage that the servo parameters of an Y-axis servo motor 30 can be adjusted so as to give the greatest efficiency.

The invention claimed is:

1. A machine tool which makes a tool which is attached to a spindle and a workpiece which is attached to a table move relative to each other to machine said workpiece, said machine tool comprising:
   a bed which serves as a base frame,
   a lifter which moves along a top-bottom guide which is provided at a back surface of said bed upward from near a floor surface,
   a spindle head which is provided at said lifter and supports said spindle in a rotatable manner, and
   a table which is provided at a top surface side of said bed and to which said workpieace is attached,
   wherein said lifter is driven in a top-bottom direction by a top-bottom driver which has a single top-bottom feed screw which is provided at said bed to be parallel to said top-bottom guide and a feed motor which is coupled below said top-bottom feed screw and is arranged near the floor surface,
   the single top-bottom feed screw is provided at a center part of a left and right pair of top-bottom guides in parallel with said top-bottom guide, and
   the machine tool is provided with a pair of working fluid channels which receive working fluid which drops down from a periphery of said table to the inside of said bed, divide said working fluid into two branched channels, pass between said top-bottom feed screw and said left and right pair of top-bottom guides, and guide the working fluid to a working fluid tank which is provided at the rear of said bed.

2. A machine tool which makes a tool which is attached to a spindle and a workpiece which is attached to a table move relative to each other to work said workpiece, said machine tool comprising:
   a bed which serves as a base frame,
   a top-bottom movement member which moves along a left and right pair of top-bottom guides which are provided at a back surface of said bed upward from near a floor surface,
   a top-bottom driver which has a single top-bottom feed screw which is provided at a center part of said left and right pair of top-bottom guides in parallel with said top-bottom guides and which makes said top-bottom movement member move while coupling a feed motor to below said top-bottom feed screw so as to be arranged near the floor surface,
   a left-right movement member which moves along a front and rear pair of left-right guides which are provided at said top-bottom movement members in a left-right direction,
   a left-right driver which has a single left-right feed screw which is provided at a center part of said front and rear pair of left-right guides in parallel with said left-right guides and which makes said left-right movement member move,
   a front-rear movement member which moves along a left and right pair of front-rear guides which are provided at said left-right movement member in a front-rear direction,
   a front-rear driver which has a single front-rear feed screw which is provided at a center part of said left and right pair of front-rear guides in parallel with said front-rear guides and makes said front-rear movement member move,
   a spindle head which is provided at said front-rear movement member and rotatably supports said spindle to which said tool is attached, and
   a table which is provided at a top surface side of said bed and to which said workpiece is attached.

* * * * *